US010162885B2

(12) United States Patent
Rozsa et al.

(10) Patent No.: US 10,162,885 B2
(45) Date of Patent: *Dec. 25, 2018

(54) AUTOMATED SELF-SERVICE USER SUPPORT BASED ON ONTOLOGY ANALYSIS

(71) Applicant: International Business Machines Corporation, Armonk, NY (US)

(72) Inventors: Eniko I. Rozsa, Coquitlam (CA); Homa Javahery, Calgary (CA); Paul Alan Yamamoto, Burnaby (CA); Peter C. Boyle, Burnaby (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,889

(22) Filed: May 29, 2018

(65) Prior Publication Data

US 2018/0276293 A1    Sep. 27, 2018

Related U.S. Application Data

(63) Continuation of application No. 13/459,298, filed on Apr. 30, 2012, now Pat. No. 10,019,512.

(30) Foreign Application Priority Data

May 27, 2011   (CA) .................................... 2741212

(51) Int. Cl.
  *G06F 17/00*   (2006.01)
  *G06F 17/27*   (2006.01)
  (Continued)

(52) U.S. Cl.
  CPC .... *G06F 17/30672* (2013.01); *G06F 17/2785* (2013.01); *G06F 17/30684* (2013.01)

(58) Field of Classification Search
  CPC .......... G06F 17/00; G06F 17/27; G06F 17/30; G10L 21/00
  (Continued)

(56) References Cited

U.S. PATENT DOCUMENTS 5,778,157 A * 7/1998 Oatman ................... G06N 5/04
                                                    704/9
5,794,050 A * 8/1998 Dahlgren ............. G06F 17/271
                                                707/E17.074
(Continued)

FOREIGN PATENT DOCUMENTS

CN      1591416      3/2005
CN      1771712      5/2006
(Continued)

OTHER PUBLICATIONS

Chuang et al.; Automatic Query Taxonomy Generation for Information Retrieval Applications; Web Knowledge Discovery Lab; Institute of Information Science, Academia Sinica, Taiwan; 2003; 13 pages.

(Continued)

*Primary Examiner* — Seong Ah A Shin
(74) *Attorney, Agent, or Firm* — Schmeiser, Olsen & Watts, LLP; Mark Vallone

(57) ABSTRACT

A method for providing information to a user in response to a received user query. A natural language analysis generates substrings relevant to an input user query pertaining to a problem a user experiences with a product or service. An ontology analysis outputs: terms of an ontology matching the relevant generated substrings; and relationships between the terms. Elements of a perfect or complete query are captured and include information pertaining to the user's problem. The input user query is refined based on the outputted terms and relationships between the terms. A search query is performed, based on the refined user query. The results of the search are provided to the user.

14 Claims, 10 Drawing Sheets

(51) Int. Cl.
*G06F 17/30* (2006.01)
*G10L 21/00* (2013.01)

(58) Field of Classification Search
USPC .............. 704/4, 9, 275; 707/603, 706, 751
See application file for complete search history.

(56) References Cited

U.S. PATENT DOCUMENTS

| | | | |
|---|---|---|---|
| 5,953,718 A * | 9/1999 | Wical | G06F 17/30616 |
| 6,094,652 A * | 7/2000 | Faisal | G06F 17/3064 |
| 6,178,416 B1 * | 1/2001 | Thompson | G06F 17/30395 |
| 6,363,378 B1 * | 3/2002 | Conklin | G06F 17/30646 |
| 6,405,190 B1 * | 6/2002 | Conklin | G06F 17/30684 |
| 6,484,155 B1 * | 11/2002 | Kiss | G06F 17/30864 |
| | | | 706/45 |
| 6,487,545 B1 * | 11/2002 | Wical | G06F 17/271 |
| | | | 706/45 |
| 6,510,406 B1 * | 1/2003 | Marchisio | G06F 17/2715 |
| | | | 704/9 |
| 6,584,470 B2 * | 6/2003 | Veale | G06F 17/30734 |
| 6,598,043 B1 * | 7/2003 | Baclawski | G06F 17/3066 |
| 6,654,740 B2 | 11/2003 | Tokuda et al. | |
| 6,675,159 B1 * | 1/2004 | Lin | G06F 17/2705 |
| 6,778,995 B1 | 8/2004 | Gallivan | |
| 6,847,966 B1 | 1/2005 | Sommer et al. | |
| 6,993,475 B1 * | 1/2006 | McConnell | G06F 17/241 |
| | | | 704/10 |
| 6,996,575 B2 | 2/2006 | Cox et al. | |
| 7,027,974 B1 * | 4/2006 | Busch | G06F 17/271 |
| | | | 704/4 |
| 7,117,207 B1 * | 10/2006 | Kerschberg | G06F 17/30702 |
| 7,155,668 B2 | 12/2006 | Holland et al. | |
| 7,225,183 B2 * | 5/2007 | Gardner | G06F 19/28 |
| 7,249,121 B1 * | 7/2007 | Bharat | G06F 17/30663 |
| 7,272,183 B2 * | 9/2007 | Abiko | H04N 19/61 |
| | | | 348/700 |
| 7,302,383 B2 * | 11/2007 | Valles | G06F 17/271 |
| | | | 704/231 |
| 7,310,641 B2 * | 12/2007 | Moore | G06F 9/5055 |
| 7,310,642 B2 * | 12/2007 | McConnell | G06F 17/241 |
| | | | 707/748 |
| 7,328,209 B2 * | 2/2008 | Das | G06F 17/30418 |
| 7,349,896 B2 * | 3/2008 | Chowdhury | G06F 17/30675 |
| 7,412,440 B2 * | 8/2008 | Mori | G06F 17/30864 |
| 7,461,047 B2 * | 12/2008 | Masuichi | G06F 17/2785 |
| | | | 706/62 |
| 7,467,232 B2 * | 12/2008 | Fish | G06F 17/30672 |
| | | | 707/E17.109 |
| 7,467,376 B2 | 12/2008 | Le Metayer et al. | |
| 7,512,575 B2 * | 3/2009 | Mahesh | G06F 17/2795 |
| | | | 706/45 |
| 7,512,576 B1 * | 3/2009 | Syeda-Mahmood | G06F 17/30734 |
| | | | 706/45 |
| 7,519,529 B1 * | 4/2009 | Horvitz | G06F 17/279 |
| | | | 369/30.04 |
| 7,526,425 B2 * | 4/2009 | Marchisio | G06F 17/30672 |
| | | | 704/9 |
| 7,533,089 B2 * | 5/2009 | Pan | G06F 17/2785 |
| 7,539,934 B2 | 5/2009 | Kender et al. | |
| 7,542,969 B1 | 6/2009 | Rappaport et al. | |
| 7,543,232 B2 | 6/2009 | Easton, Jr. et al. | |
| 7,562,069 B1 * | 7/2009 | Chowdhury | G06F 17/30864 |
| 7,587,308 B2 * | 9/2009 | Kasravi | G06F 17/273 |
| | | | 382/229 |
| 7,610,192 B1 * | 10/2009 | Jamieson | G06Q 50/22 |
| | | | 704/1 |
| 7,613,664 B2 * | 11/2009 | Riezler | G06F 17/30702 |
| | | | 706/16 |
| 7,644,052 B1 * | 1/2010 | Chang | G06N 5/022 |
| | | | 706/45 |
| 7,657,417 B2 | 2/2010 | Adamson et al. | |
| 7,657,546 B2 | 2/2010 | Goodwin et al. | |
| 7,668,825 B2 | 2/2010 | Vogel et al. | |
| 7,693,827 B2 * | 4/2010 | Zamir | G06F 17/30867 |
| | | | 707/999.003 |
| 7,694,212 B2 * | 4/2010 | Fikes | G06F 17/30876 |
| | | | 715/200 |
| 7,739,258 B1 * | 6/2010 | Halevy | G06F 17/243 |
| | | | 707/706 |
| 7,747,632 B2 * | 6/2010 | Korn | G06Q 30/02 |
| | | | 707/751 |
| 7,778,820 B2 * | 8/2010 | Horvitz | G06F 17/30705 |
| | | | 704/9 |
| 7,822,750 B2 | 10/2010 | Duchon et al. | |
| 7,836,083 B2 | 11/2010 | Cipollone | |
| 7,873,640 B2 | 1/2011 | Chang et al. | |
| 7,921,099 B2 | 4/2011 | Bierner | |
| 8,078,573 B2 * | 12/2011 | Betz | G06F 17/30616 |
| | | | 707/603 |
| 8,335,754 B2 * | 12/2012 | Dawson | G06F 17/2705 |
| | | | 706/45 |
| 8,386,335 B1 * | 2/2013 | Cohen | G06Q 10/10 |
| | | | 705/26.1 |
| 8,386,475 B2 | 2/2013 | Green et al. | |
| 8,498,974 B1 * | 7/2013 | Kim | G06F 17/30867 |
| | | | 707/706 |
| 8,515,811 B2 * | 8/2013 | Taylor | G06F 17/30867 |
| | | | 705/14.47 |
| 8,566,369 B2 | 10/2013 | Rousseau et al. | |
| 8,660,849 B2 * | 2/2014 | Gruber | G06F 17/3087 |
| | | | 704/275 |
| 9,104,660 B2 | 8/2015 | Boyle et al. | |
| 9,141,605 B2 | 9/2015 | Boyle et al. | |
| 9,318,108 B2 * | 4/2016 | Gruber | G10L 15/1815 |
| 9,368,114 B2 * | 6/2016 | Larson | H04M 1/72522 |
| 2003/0221705 A1 | 12/2003 | Han et al. | |
| 2004/0010491 A1 | 1/2004 | Riedinger | |
| 2004/0111465 A1 | 6/2004 | Chuang et al. | |
| 2005/0131695 A1 * | 6/2005 | Lucente | G10L 15/22 |
| | | | 704/257 |
| 2005/0138018 A1 | 6/2005 | Sakai et al. | |
| 2005/0256819 A1 * | 11/2005 | Tibbs | G06N 5/02 |
| | | | 706/46 |
| 2005/0267871 A1 | 12/2005 | Marchisio et al. | |
| 2006/0047632 A1 * | 3/2006 | Zhang | G06F 17/30734 |
| 2006/0224580 A1 | 10/2006 | Quiroga et al. | |
| 2006/0271353 A1 * | 11/2006 | Berkan | G06F 17/2775 |
| | | | 704/9 |
| 2008/0071772 A1 * | 3/2008 | Rosenoff | G06F 17/30864 |
| 2009/0089270 A1 * | 4/2009 | Haley | G06F 17/3066 |
| 2009/0228777 A1 * | 9/2009 | Henry | G06F 17/30017 |
| | | | 715/230 |
| 2012/0016678 A1 * | 1/2012 | Gruber | G06F 17/3087 |
| | | | 704/275 |
| 2012/0030228 A1 * | 2/2012 | Naidu | G06F 17/30864 |
| | | | 707/767 |
| 2012/0259882 A1 * | 10/2012 | Thakur | G06F 17/30873 |
| | | | 707/767 |
| 2012/0303356 A1 | 11/2012 | Boyle et al. | |
| 2013/0204877 A1 | 8/2013 | Boyle et al. | |
| 2013/0204993 A1 * | 8/2013 | Uribe-Etxebarria Jimenez | G06Q 10/10 |
| | | | 709/223 |
| 2015/0142704 A1 * | 5/2015 | London | G06N 5/04 |
| | | | 706/11 |

FOREIGN PATENT DOCUMENTS

| | | |
|---|---|---|
| CN | 1846210 | 10/2006 |
| CN | 101059806 | 10/2007 |
| KR | 20070113098 | 11/2007 |
| KR | 100980579 | 9/2010 |
| TW | 200521732 | 7/2005 |
| TW | 200627198 | 8/2006 |
| WO | WO0210980 | 2/2002 |
| WO | WO2005062202 | 7/2005 |

(56) References Cited

FOREIGN PATENT DOCUMENTS

| WO | WO2007059287 | 5/2007 |
|---|---|---|
| WO | WO2010017159 | 2/2010 |

OTHER PUBLICATIONS

Chu et al.; Semantic Association of Taxonomy-based Standards Using Ontology; Computer and Information Sciende and Engineering, University of Florida, Gainesville, FL, USA; 2005; 7 pages.
Ruotsalo, Tuukka; Methods and Applications for Ontology-Based Recommender Systems, Doctoral Dissertation; Aalto University, School of Science and Technology, Faculty of Information and Natural Sciences, Department of Media Technology, Espoo, Finland; Jun. 7, 2010; 96 pages.
Karat et al.; Sparcle Policy Management Workbench; IBM Research [retrieved on Jan. 12, 2012]; retrieved from the Internet: <URL: http://www.domino.research.ibm.com/comm/research_projects.nsf/pages/sparcle...>; 7 pages.
Rozsa, Eniko; 1-2-3 Portal Workflow Assistant Rel1—Requirements Review; 2009 IBM Corporation; 15 pages.
Havahery et al.; CSA Support 2.0, 1-2-3 Portal Workflow Assistant, High Level Ontology Design Document; IBM Centres for Solution Innovation; Vancouver; 2010; 35 pages.
Office Action (dated Oct. 3, 2013) for U.S. Appl. No. 13/459,298, filed Apr. 30, 2012.
Damljanovic et al., Natural Language to Ontologies: Combining Syntactic Analysis and Ontology-Based Lookup through the User Interaction, ESWC 2010, Part I, LNCS 6088, pp. 106-120, copyright Springer-Verlag Berlin Heidelberg.
International Search Report, PCT, 4 pages, International application No. PCT/CA2012/050321, International Filing Date May 17, 2012.
Office Action dated Oct. 3, 2013 for U.S. Appl. No. 13/459,310, filed Apr. 30, 2012, First Named Inventor Currie P. Boyle, Confirmation No. 7339.
Amendment (dated Jan. 3, 2014) for U.S. Appl. No. 13/459,298, filed Apr. 30, 2012.
Final Office Action (dated Mar. 14, 2014) for U.S. Appl. No. 13/459,298, filed Apr. 30, 2012.
Final Office Action (dated Mar. 13, 2014) for U.S. Appl. No. 13/459,310, filed Apr. 30, 2012.
Office Action (dated Mar. 12, 2014) for U.S. Appl. No. 13/689,905, filed Nov. 30, 2012, Conf. No. 3972.
Final Amendment (dated May 9, 2014) for U.S. Appl. No. 13/459,298, filed Apr. 30, 2012.
Advisory Action (dated Jun. 11, 2014) for U.S. Appl. No. 13/459,298, filed Apr. 30, 2012.
Office Action (dated Mar. 12, 2014) for U.S. Appl. No. 13/689,905, filed Nov. 30, 2012.
Amendment (filed Jun. 11, 2014) for U.S. Appl. No. 13/689,905, filed Nov. 30, 2012.
Notice of Appeal (dated Jun. 16, 2014) for U.S. Appl. No. 13/459,298, filed Apr. 30, 2012.
Notice of Appeal (filed Jun. 16, 2014) for U.S. Appl. No. 13/459,310, filed Apr. 30, 2012, Conf. No. 7339.
Appeal (dated Aug. 14, 2014) for U.S. Appl. No. 13/459,298, filed Apr. 30, 2012.
Appeal Brief (filed Aug. 13, 2014) for U.S. Appl. No. 13/459,310, filed Apr. 30, 2012, Conf. No. 7339.
Notice of Allowance dated Aug. 8, 2014 for U.S. Appl. No. 13/689,905, filed Nov. 30, 2012, Conf. No. 3972.
Patent application for U.S. Appl. No. 14/494,791, filed Sep. 24, 2014, Conf. No. 3535.
Notice of Allowance (dated Nov. 5, 2014) for U.S. Appl. No. 13/689,905, filed Nov. 30, 2012, Conf. No. 3972.
Examiner's Answer (dated Nov. 21, 2014) for U.S. Appl. No. 13/459,298, filed Apr. 30, 2012.
Reply Brief (dated Jan. 20, 2015) for U.S. Appl. No. 13/459,298, filed Apr. 30, 2012.
Reply Brief (filed Jan. 20, 2015) for U.S. Appl. No. 13/459,310, filed Apr. 30, 2012, Conf. No. 7339.
European Patent Search Report, Reference No. CA920110091EP1, Application No. 13 746 495.4, dated Jan. 23, 2015, 7 pages.
Amendment (dated Apr. 23, 2015) for U.S. Appl. No. 14/494,791, filed Sep. 24, 2014, Conf. No. 3535.
Office Action (dated Jan. 27, 2015) for U.S. Appl. No. 14/494,791, filed Sep. 24, 2014, Conf. No. 3535.
Notice of Allowance (dated May 18, 2015) for U.S. Appl. No. 14/494,791, filed Sep. 24, 2014, Conf. No. 3525.
Decision on Appeal (dated Jan. 27, 2017) for U.S. Appl. No. 13/459,298, filed Apr. 30, 2012
RCE (dated Mar. 28, 2017) for U.S. Appl. No. 13/459,298, filed Apr. 30, 2012.
Canadian Office Action (dated Mar. 16, 2017) Application No. 2,741,212, 7 pages.
Office Action (dated Jun. 1, 2017) for U.S. Appl. No. 13/459,298, filed Apr. 30, 2012.
Chinese Office Action (dated May 3, 2017), 2 Pages.
Amendment (dated Aug. 31, 2017) for U.S. Appl. No. 13/459,298, filed Apr. 30, 2012.
Office Action (dated Jun. 1, 2017) U.S. Appl. No. 13/459,310, filed Apr. 30, 2012.
Amendment (dated Aug. 31, 2017) U.S. Appl. No. 13/459,310, filed Apr. 30, 2012.
Final Office Action (dated Nov. 8, 2017) for U.S. Appl. No. 13/459,298, filed Apr. 30, 2012.
Final Amendment (dated Jan. 8, 2018) for U.S. Appl. No. 13/459,298, filed Apr. 30, 2012.
Advisory (dated Jan. 29, 2018) for U.S. Appl. No. 13/459,298, filed Apr. 30, 2012.
RCE (dated Feb. 8, 2018) for U.S. Appl. No. 13/459,298, filed Apr. 30, 2012.
Notice of Allowance (dated Mar. 5, 2018) for U.S. Appl. No. 13/459,298, filed Apr. 30, 2012.

* cited by examiner

AUTOMATED SELF-SERVICE USER SUPPORT BASED ON ONTOLOGY ANALYSIS

This application is a continuation application claiming priority to Ser. No. 13/459,298, filed Apr. 30, 2012.

TECHNICAL FIELD

The present invention relates generally to computer software, and more particularly, to automated self-service user support based on an ontology of domain-specific information.

BACKGROUND

Automated self-service software applications are commonly deployed by business enterprises to support customers with inquiries and problems concerning their products or services. Such applications may be integrated with call center utilities to minimize the need for live support. Self-service support applications may use formal categories to describe the domain in which anticipated inquiries and problems may occur, such as a domain on computer products or financial services. The self-service support applications often assume that inquiry and problem categories are well known and can easily be interpreted by the users. The applications may further assume that the formal categories have universal definitions. However, these definitions are often dependent on the underlying back-end support systems. In addition, most users would prefer to describe their problems or explain their needs in their own terms, using free-form text. The user terms may not align with the formal problem categories or descriptions maintained by the user support system.

For example, a user may explain a problem in the form of the statement "My laptop fails when I run program XYZ after I have started a backup using program MNO". Whereas, the user's company back-end technical support systems are typically categorized using very specific terminology, e.g., laptop/desktop, operating system. CPU type, application, program, driver, storage, backup/restore, etc. The self-service applications are thus less effective when their user interfaces are based on system-centric terminology that does not match with the users' terminology.

Furthermore, even if the users know the specific system-centric terminology, they may not be able to formulate their questions to a degree where satisfactory results can be expected, unless they are aware what constitutes a complete description of a problem. This is due to the fact the users do not know the specific domain that support system uses and are not familiar with the terms, attributes, and relationships in this domain.

There is thus a need for improved systems and processes for assisting users to formulate self-service inquiries and effectively processing such self-service user inquiries.

BRIEF SUMMARY

The present invention provides a method for providing information to a user in response to a received user query, said method comprising:

a processor of a computer system receiving the user query from the user, said received user query expressed in a free-form text format;

said processor performing a natural language analysis to generate substrings relevant to the received user query;

after said performing the natural language analysis, said processor performing an ontology analysis to output terms of an ontology of domain-specific information and to further output relationships between pairs of said terms, said outputted terms constrained to match the relevant substrings generated by said performing the natural language analysis;

after said performing the ontology analysis, said processor performing a query analysis to analyze the user query with respect to the outputted terms and relationships between the terms, said performing the query analysis comprising ascertaining whether the user query is more suitable for service than for a search for information;

if said ascertaining ascertains that the user query is more suitable for service than for said search for information, then identifying, to the user, service actions to be performed by the user;

if said ascertaining ascertains that the user query is not more suitable for service than for said search for information, then refining the user query based on the outputted terms and relationships between the terms, generating a search query based on the refined user query, initiating a search based on the search query, and providing results of the search to the user.

DETAILED DESCRIPTION

Figure 1:
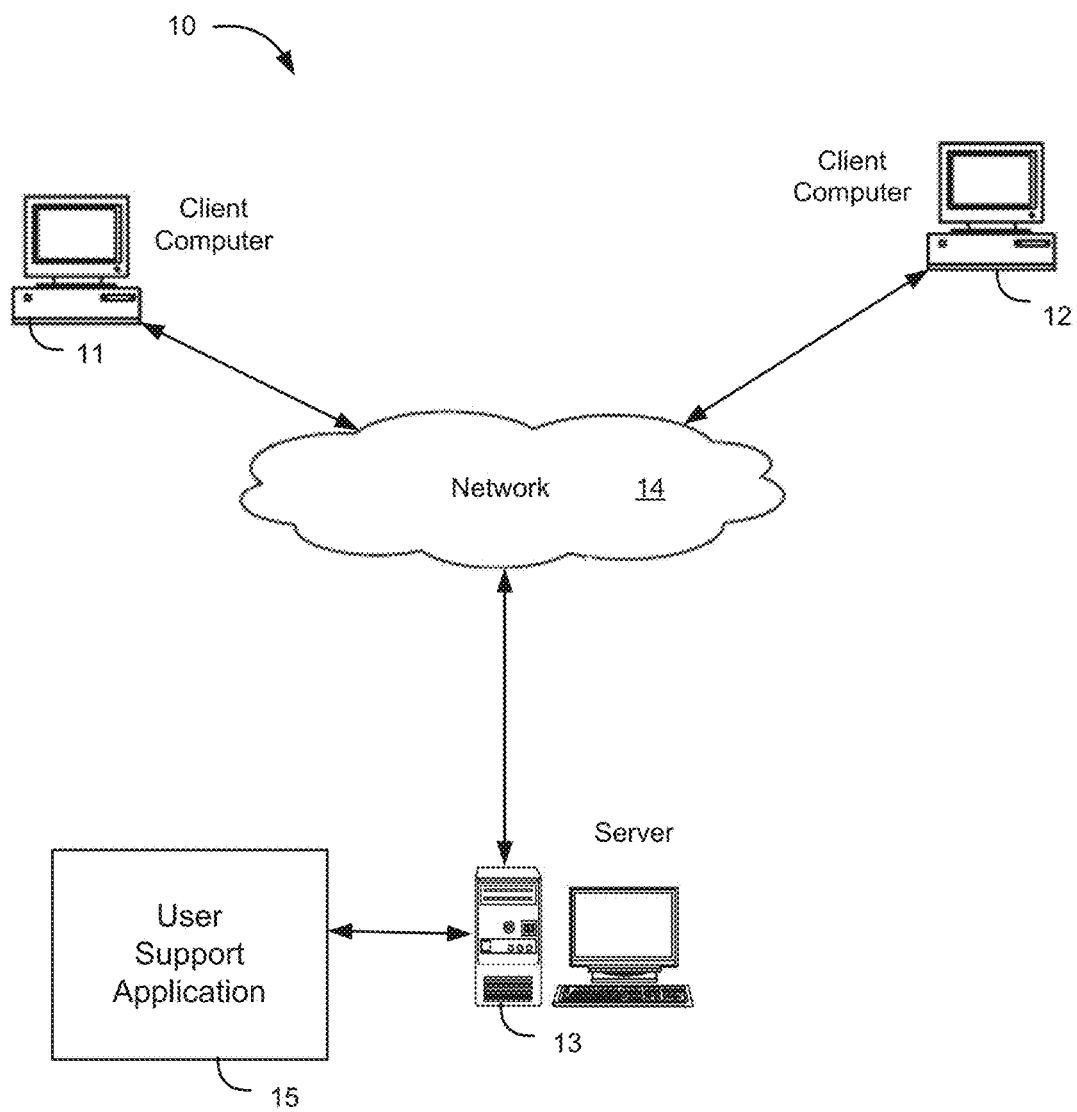
FIG. 1 illustrates a block diagram of an exemplary user support configuration in which aspects of the disclosure may be provided, in accordance with embodiments of the present invention.

Exemplary embodiments of the disclosure relate to self-service user support applications that are based on the analysis of ontologies on domain-related information. One aspect of the disclosure concerns a system for providing information relating to a user query. The user query may concern a problem that the user experienced with a product or service, a question about a product or service, or other customer/user needs. The system may comprise a natural language processor for identifying relevant terms in the user query and an ontology analyzer for matching the relevant terms to concepts in an ontology related to the user query. The system may further include a query processor for refining the user query using the matching relevant terms and ontology concepts, and a search engine for identifying from a database information relevant to the refined user query.

Another aspect of the disclosure concerns a computer implemented method for providing information relating to a user query. The method may comprise parsing the user query to identify relevant terms from the user query, matching the relevant terms to concepts in an ontology that are related to the user query, refining the query based on the matching relevant terms and ontology concepts, and searching a database for information relevant to the refined user query.

Still another aspect of the disclosure concerns a computer program product for providing information relating to a user query. The computer program product comprises a computer readable storage medium having computer readable program code embodied therewith and configured to parse the user query to identify relevant terms from the user query, and match the relevant terms to concepts in an ontology that are related to the user query. The program code may further be configured to refine the user query based on the matching relevant terms and ontology concepts, and search a database for information relevant to the refined user query.

Exemplary embodiments of the disclosure relate to self-service user support applications based on domain-specific information. As examples, the embodiments of the disclosure may be applicable to customer support systems in information technology (IT), financial services, health care, public sector information, legal services, education, and product marketing, among others. The embodiments may be provided as stand-alone product information or service support systems, or integrated with call center support applications. The embodiments allow a customer or user to enter a problem or need in free-form text. For example, in a financial services environment, a customer may enter an inquiry in the form of "How to set up transfers from a bank account to a brokerage account?"

The embodiments may receive a user query, identify relevant terms and details from the user query, and if necessary, generate context-specific user questions based on knowledge-driven understanding and intelligence leveraged from the ontology. The query may be refined with user answers to additional questions presented to the user. This is an iterative process in which the query may be re-processed based on the questions and answers. The embodiments may use relevant terms and details extracted from the user query to analyze an ontology of domain-specific information and generate a search query. The embodiments may use the search query to identify information related to the user query from available information repositories or suggest relevant follow-on actions, such as applicable tools or ancillary processes. The information identified by the embodiments of the invention may include document titles, portions of documents, user manuals, web pages, tools, processes, and links to documents that are relevant to the user query.

Referring to FIG. 1, there is illustrated a block diagram of an exemplary computer configuration in which aspects of the disclosure may be provided. Computer configuration 10 may include multiple client computers 11-12 for accessing a server 13 to receive user support through network 14. Server 13 may host a self-service user support application 15 for assisting customers with their product information or service problems, and providing answers to customer inquiries.

Figure 2:
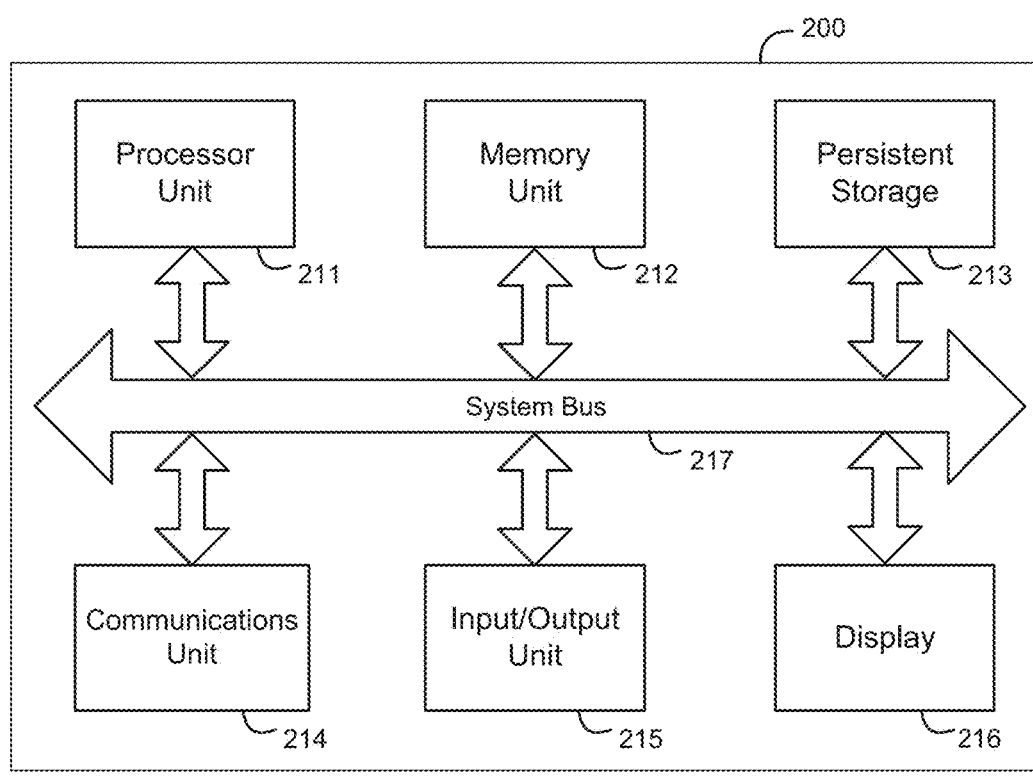
FIG. 2 illustrates a block diagram of a representative computer system that may be used in a computer-based user support system, such as the support configuration in FIG. 1, for providing aspects of the present invention.

FIG. 2 illustrates a block diagram of a representative computer system that may be used in a user support configuration, such as the configuration 10 in FIG. 1, for providing aspects of the invention. Data processing system 200 may include a processor unit 211, a memory unit 212, a persistent storage 213, a communications unit 214, an input/output unit 215, a display 216, and system bus 217. Computer programs are typically stored in persistent storage 213 until they are needed for execution, at which time the programs are brought into memory unit 212 so that they can be directly accessed by processor unit 211. Processor 211 selects a part of memory 212 to read and/or write by using an address processor 211 gives to memory 212 along with a request to read and/or write. Usually, the reading and interpretation of an encoded instruction at an address causes processor 211 to fetch a subsequent instruction, either at a subsequent address or some other address. Thus, a computer system of the present invention may comprise a processor (e.g., processor 211), a memory (e.g., memory 212) coupled to the processor, and a computer readable storage device (e.g., persistent storage 213) coupled to the processor, said storage device containing program code configured to be executed by the processor via the memory implement the methods of the present invention.

Figure 3:
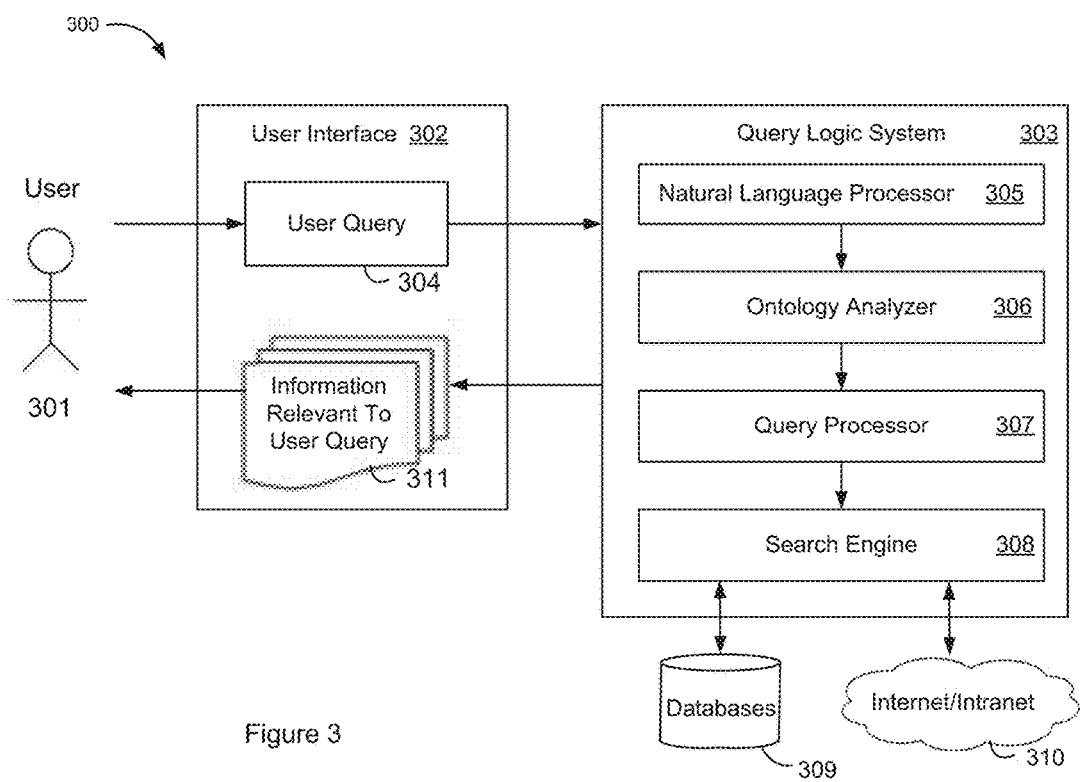
FIG. 3 illustrates a block diagram of a self-service support system for receiving and analyzing a user query based on an ontology of domain-specific information, and returning information relevant to the user query, according to an embodiment of the present invention.

FIG. 3 illustrates a block diagram of a self-service support system 300 for receiving a user query, analyzing the query based on an ontology of domain-specific information, and returning information relevant to the user query, according to an exemplary embodiment of the disclosure. As examples, the domain may concern financial services or customer support for IT products. The system 300 may be a software application operating on server 13, and may comprise a user interface system 302 and a query logic system 303. User interface system 302 allows a user 301 to enter, for example, a problem, user need, or inquiry about a supported product or service. The user's problem, need or inquiry may be in the form of a user query statement 304.

Once the user query statement 304 has been analyzed and processed by the query logic system 303, the query logic system 303 may return to the user 301 documents or other information 311 that the query logic system 303 identifies as being relevant to the user query. The identified information 311 may be returned through user interface system 302. Exemplary user interface menus that the user interface system 302 may present to the user 301 are described below with reference to FIGS. 5-8.

The user interface system 302 may present the user with additional questions about the user query 304, as generated by the query logic system 303. The user interface system 302 may also forward user answers to the query logic system 303 during the processing of the user query. A function of the query logic system 303 may be to bridge between the user's free-form description of the user query 304 and the fixed back-end categories based on the use of ontologies, which are analyzed to clarify the user query statement. The bridging process may include disambiguation, augmentation, and extension of the user query 304, using a domain-specific ontology, to improve specificity and completeness of the user query. The query logic system 303 may assess the resulting user query against knowledge bases, tools, processes, or assets which may support the user's self-service request. The resulting query may be further refined by a query processor based on questions for the user and user answers.

An ontology is a data structure that formally represents concepts and associated relationships in a technical support domain, e.g., banking, health care, computer products, etc. It may be used not only to define the domain and provide a shared vocabulary, but to provide properties of data in the domain. In the embodiments of the invention, the ontology may initially be prepared by domain and ontology specialists. The query logic system 303 may refine and extend the ontology over time through text mining and ontology matching of additional user inputs, as described below with reference to the ontology editor 409 and ontology builder 410 in FIG. 4, and the ontology analysis process in FIG. 11.

An ontology may comprise an ontology model and a knowledge store. The ontology model may be in the form of a Web Ontology Language (OWL) file containing the main domain concepts, which are relatively static. The knowledge store may be in the Resource Description Format (RDF) and conform to the OWL file. As an example of a domain use, the ontology model may capture four main elements of a "perfect" or "complete" query, which may include information on: (1) what the user's need or problem is (e.g., situation, symptoms); (2) where the need or problem occurs (e.g., affected components); (3) in what environment (e.g., affected product); and (4) what changed (e.g., user activity that led to the problem).

The query logic system 303 may deduce semantic meaning in the user query and analyze it against a domain representation. The query logic system 303 may present the user with a series of questions until a search query can be generated that would return a reasonable amount of results. The query logic system 303 may further expose the user to the structure of the ontology through its questions and refine the user query based on user answers to the questions. The refinement is not automated but rather involves the user. It allows a mixed-initiative interaction, where the user is contributing to the formulation of the refined query by answering questions or providing additional information. The search query may be used to perform a meta-search, where it may be sent to a single or multiple heterogeneous back-end databases, knowledge stores and available tools, through multiple search engines. The query logic system 303 may return relevant results in a unified, but categorized and filtered by the query input, list of information.

In an exemplary embodiment of the invention, the query logic system 303 may comprise a natural language processor 305, ontology analyzer 306, query processor 307, and search engine 308. The natural language processor 305 may analyze a query entered by the user to extract key details from the user query. Query details may include, for example, the type of user problem, what the user was doing when the problem occurred, the environment in which the problem occurred, affected product components, and conditions that have changed as a result of the problem. The output from the natural language processor 305 may be in the form of relevant substrings (e.g., key ten and annotations on the relevant substrings. The natural language processor 305 is described in detail below with reference to FIGS. 4 and 10.

An ontology analyzer 306 may receive relevant strings and annotations from the natural language processor 305 for analyzing an ontology of domain-specific information related to the user query, and identifying concepts and relationships in the ontology that match the user's problem or need. The ontology analyzer 306 is described in detail below with reference to FIGS. 3-4 and 11. The query logic system 303 may further comprise a query processor 307 for refining the user query in terms of completeness and specificity. As part of the user query refining process, the query processor 307 may generate additional questions about the user's problem or need that the user interface system 302 may ask the user, and process user answers to these questions. Details on the generation of user questions and the processing of user answers are described below with reference to FIGS. 4 and 12.

The query processor 307 may further determine follow-on user service actions and present these service actions to the user, such as suggesting to the user to open a problem record or information request. As an output of the query refinement process, the query processor 307 may generate more specific terms, phrases, and additional information (if missing) that more accurately describe the user's problem or need. The query processor 307 may then provide these terms, phrases, and additional information to the search engine 308. The query processor 307 is further described below with reference to FIGS. 4 and 12.

The search engine 308 may identify information relevant to the user query 304 from databases 309 of product and service data, Internet and intranet 310, and other available repositories of information. The query logic system 303 may return the identified information to user 301 through user interface system 302. Search engine 308 may comprise a data search or data analytics program, such as Google™ search engine or IBM DB2 Intelligent Miner™.

Figure 4:
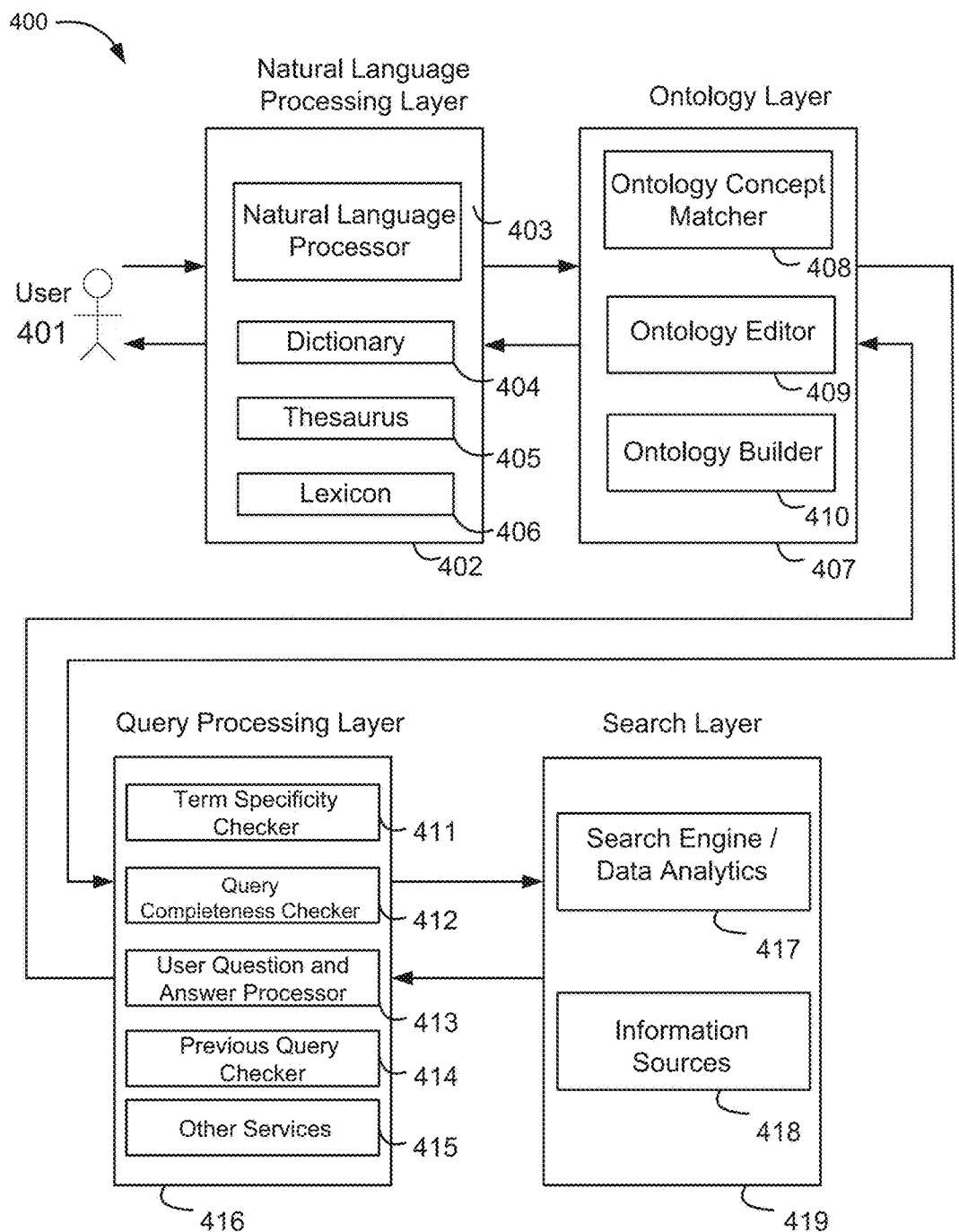
FIG. 4 illustrates in more detail another self-service support system for receiving and analyzing a user query based on an ontology of domain-specific information, and returning information relevant to the user query, according to an embodiment of the present invention.

FIG. 4 illustrates in more detail an exemplary embodiment of a query logic system 400 for receiving and analyzing a user query based on an ontology of domain-specific information, and returning relevant information to the user. The query logic system 400 may be implemented as layers where each layer is responsible for a set of related processing tasks. For example, a natural language processing layer 402 may be responsible for parsing a user query in natural language, e.g., English. The language processing layer 402 may include a natural language processor 403 for breaking the user query into tokens or key words relating to the problem, such as "failed", "program", "start up", "hang", etc. An example of the natural language processor 403 may be the IBM LanguageWare™ natural language processor. The natural language processor 403 may further parse the key words into a formal representation that is more readily utilized by a computer application.

In an embodiment of the invention, the natural language processor 403 may perform a lexical analysis of the user's description of a problem or need. It may initially parse the description into paragraphs, sentences and tokens using a break-rules dictionary. It may look up a token in one or more dictionaries to find out more information about a word, for example, its part of speech (POS). The dictionaries may include both standard linguistic dictionaries containing all words in the selected language and custom dictionaries containing words from a specific domain of knowledge.

In addition, the natural language processor 403 may perform other types of analysis to determine the nature, format and meaning of the text being processed. For example, the natural language processor 403 may apply a language identification to a body of text to determine the language in which it was written. Lexical analysis may be used to identify words and their attributes as well as determine the part of speech (POS) of each word. Semantic analysis may be employed to determine the contextual meaning of words and phrases, through an understanding of the grammatical structural patterns of a language using a process of relating syntactic structures. Semantic analysis is a phase of natural language processing, following parsing, that involves extraction of context-independent aspects of a sentence's meaning, including the semantic roles of entities mentioned in the sentence, and quantification information, such as iteration and dependency.

As part of the natural language processing, natural language processor 403 may further include functions for spell-checking, POS disambiguation, normalization (i.e., determining the lemma or canonical form of a word, which is also known as 'morphological analysis'), and anaphora resolution. Normalization is the process of determining a single string representation for a word or term found in text. For normalization of inflectional variance (run, running, runs, etc.), this is traditionally called the lemma, citation form, or canonical form. Lemmatization uses morphological analysis of words to determine a single word, called the lemma of the word, which groups together inflected forms of the words by removing only inflectional endings of the words. Part of Speech (POS) is the linguistic category of a word, such as noun (the run), verb (to run), adjective (runny honey), etc. POS disambiguation is the process of assigning the correct POS to a word and word sense (semantic) disambiguation is the process of identifying which sense of a word is used in any given sentence when the word has a number of distinct senses.

The natural language processor 403 may refer to a dictionary 404 to obtain the meaning of unfamiliar terms that the user enters. It may look up a thesaurus 405 for synonyms, antonyms, etc., and a lexicon 406 for expressions. A lexicon is a language's vocabulary that includes words as well as common expressions. It is a language's inventory of lexemes. The lexicon includes not only entries for words and phrases, but also lexical relations, syntactic argument structures, and grammatical relations. During the processing of the user query by natural language processor 403, the natural language processing layer 402 may extract key substrings from the user query and provide them to an ontology layer 407. The ontology layer 407 may match these substrings against an ontology of domain-specific information that is related to the user's need or problem.

As an example, the user may input a query as "Instollation problem on UNIX". The natural language processing layer 402 may perform the following tasks:
Identify the language of the text as English.
Recognize the misspelling of "installation" (Installation)
Determine the canonical form of "installation" (install).
Recognize a technical support domain term (UNIX).
Semantic recognition of an incident (Installation problem).

Once the natural language process is competed, the ontology layer 407 of the query logic system 400 may begin analyzing the user query against a related domain ontology. The query logic system 400 may iteratively refine the user query based on concepts and relationships that the ontology layer 407 identifies from the ontology, with the goal of increasing the relevance of search results.

The ontology layer 407 may include an ontology concept matcher 408 for examining terms and relationships in the ontology and matching them against the substrings that were extracted from the user query. The ontology may be visualized as a tree comprising nodes and edges connecting adjacent nodes, wherein each node in the tree is associated with a term, and wherein a connection between two nodes is an edge representing a relationship between the terms associated with the connected nodes. Based on the analysis of the ontology, the ontology concept matcher 408 may provide a set of terms from the ontology, and their relationships, that match the relevant substrings extracted from the user query. The matched terms and relationships may be forwarded to the query processing layer 416 for continued processing by the query logic system 400.

The ontology concept matcher 408 may match a token extracted from or generated from the user query to each concept in an ontology (e.g., a node in an ontology structure), and attributes and relationships associated with the concept. In one embodiment, the token is a substring relevant to the user query generated by the natural language processor. Attributes may include sub-components, acronyms, and synonyms of the concept. If there is a match between the token and a concept (i.e., term) in the ontology, the natural language processing layer 402 may annotate the token (e.g., generated substring) with the matching concept (e.g., matching term represented by a node in the tree representing the ontology) and its associated pillars. The associated pillars may include situations, activities, products, IT components, etc., that mirror requirements of a "perfect" query.

If the ontology concept matcher 408 identifies a partial match between a token and an ontology concept, the natural language processing layer 402 may annotate the matching token, and if necessary the query logic system 400 may confirm the partial ontology match with the user. In case the ontology concept matcher 408 identifies multiple ontology concepts that match a token, the query logic system 400 may ask the user to clarify and select the best ontology match through questions for the user. The user can choose the correct words based on the context, pillar and description of the matching token and ontology concepts.

The ontology layer 407 may further comprise an ontology editor 409 and an ontology builder 410. The ontology editor 409 allows an ontology specialist to edit and create an ontology for a particular domain. An example ontology editor is the open-source Protege editor. Using the Protege editor, an ontology specialist can edit and create an ontology in RDF and OWL script languages. The ontology builder 410 allows an ontology to be updated with additional terms and relationships that the query logic system 400 may identify while processing user queries. The ontology builder 410 thus extends the ontology and refines its contents over time in terms of completeness and accuracy, based on actual user needs and problems and information identified in response to user queries.

Once the ontology-matching process is completed, the query logic system 400 may forward matched ontology concepts to the query processing layer 416 to assess whether the user query is complete and specific enough for processing or needs refinement with additional user input. The query processing layer 416 may include a term checker 411 for determining the specificity of the key terms extracted from the user query. For each part of the user query, the terra checker 411 may determine whether the returned ontology match is sufficiently specific for a search. If the ontology match is not specific enough, the query processing layer 416 may ask the user additional questions to improve the specificity of the ontology match.

The query processing layer 416 may include a completeness checker 412 to assess whether the user query is sufficiently complete for processing. The completeness checker 412 may determine whether each part of a "perfect" query is satisfied. In an exemplary embodiment, completeness may mean that the query logic system 400 has sufficient information to allow an expert in the field to respond to the user. For example, the query logic system 400 may need information on: at what the user was trying to do, b) what problem the user encountered, and c) what product or service the user was using. All three aspects of the problem description would be needed to satisfy completeness. For any missing elements, the query processing layer 416 may ask the user further questions with the goal of satisfying each part of a perfect query.

The query processing layer 416 may include a user question and answer processor 413 for generating user questions and obtaining additional details about the user's problem or need. Information obtained from the user questions and answers is used to refine the user query, as described above. In an exemplary embodiment, the questions may address areas that would help the system "understand" the problem better, such as "what the problem is?", "where did the problem occur?", "in what environment?", and "what changed?". The question and answer processor 413 may not always ask all the questions. It may determine which questions to ask depending of the level of specificity and granularity of the user query, to allow the query logic system 400 to reasonably return relevant results. The results may include suitable documents from a search on the user's need or problem in various domains, or relevant follow-on actions such as applicable tools and services.

In an example embodiment, the user question and answer processor 413 may combine information in the domain ontology with the user's specific problem or need to explain a condition that might have caused the user's problem and to improve the user's trust and relationship. For example, in response to a customer's problem concerning a financial transaction, the question and answer processor 413 may inform the customer of a recent system upgrade, offer to assist the customer by telephone, and provide incentives that may be of value to the customer.

The question and answer processor 413 may further tailor the questions to display specific words that are appropriate for the user's situation. The questions may include substituted words to allow the system to interact in the context relevant to the user. For example, the user may state in the user query that "the notebook computer failed to boot". In generating questions for the user, the question and answer processor 413 may substitute the word "laptop" in its repository of questions with the word "notebook". Through refinement questions for the user, the question and answer processor 413 can expose the ontology structure to the user, thereby allowing the user to learn more about the particular domain that the query logic system 400 is using. Based on the user's answers, the question and answer processor 413 may generate additional user questions to further refine the user query.

The user question and answer interaction is thus an iterative process for refining the user query with user input. The question and answer processor 413 may capture significant elements of the user query, but may ask further questions and provide answer suggestions based on the domain-specific ontology until the user query is close to a "perfect" query. The query logic system 400 is providing a learning experience to the user to formulate better questions, while the user is potentially providing extra, not yet captured domain-specific knowledge to be added over time to the formal representation of the domain (ontology). Specifically, the question and answer processor 413 refines and optimizes the user's free-form text entry with the purpose of describing the user's need or problem with sufficient specificity and completeness. It leverages concepts and relationships from the ontology to determine the questions and the sequence of presenting the questions to the user.

The query processing layer 416 may further include a previous query checker 414 to determine whether the user query is similar to a query that has previously been processed by the query logic system 400. Previously handled queries and their solutions may be maintained in a knowledge repository which the query logic system 400 can access. For example, the user query may concern a computer's failure to boot that was caused by the installation of a particular program, and this problem has previously been processed by the query logic system 400 and stored in a database. The previous query checker 414 may look up information relating to this particular problem in the repository and respond to the user with the identified procedure for fixing the problem, without re-processing the user query.

The query processing layer 416 may comprise other services 415 such as functions to determine follow-on actions for the user or request the user to create a problem report, a purchase request, or an online process/activity. Other services 415 may determine that the user query is more suitable for a service rather than a search. User services may include analyzing system logs, cataloging symptoms, or checking the compatibility of products, models, release versions, etc., for either sales or support functions.

Once the query processing layer 416 has checked the completeness and specificity of the user query, and refined the user query if necessary, it may send relevant key terms and relationships about the user's need or problem to a search layer 419. The search layer 419 may include a search engine or data analytics program 417 with access to relevant information sources 418 such as databases of product documents. The search engine or data analytics program 417 may also access the Internet or a company's intranet to search for information relevant to the query. The search layer 419 may employ a result-ranking utility for ranking the information sources that best match the key terms of the user query and returning a set of best-matching results. The search layer 419 may then return the best-matching results to the user through the user interface 302.

Figure 5:
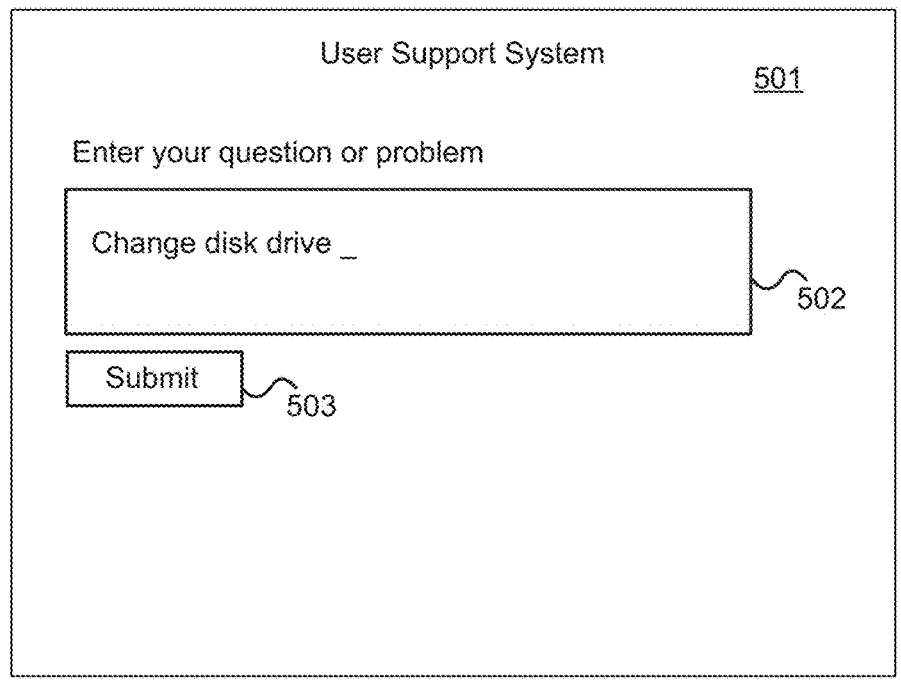
FIG. 5 illustrates an exemplary user interface menu for entering a user query that may be processed by an embodiment of a self-service support system of the present invention.
Figure 6:
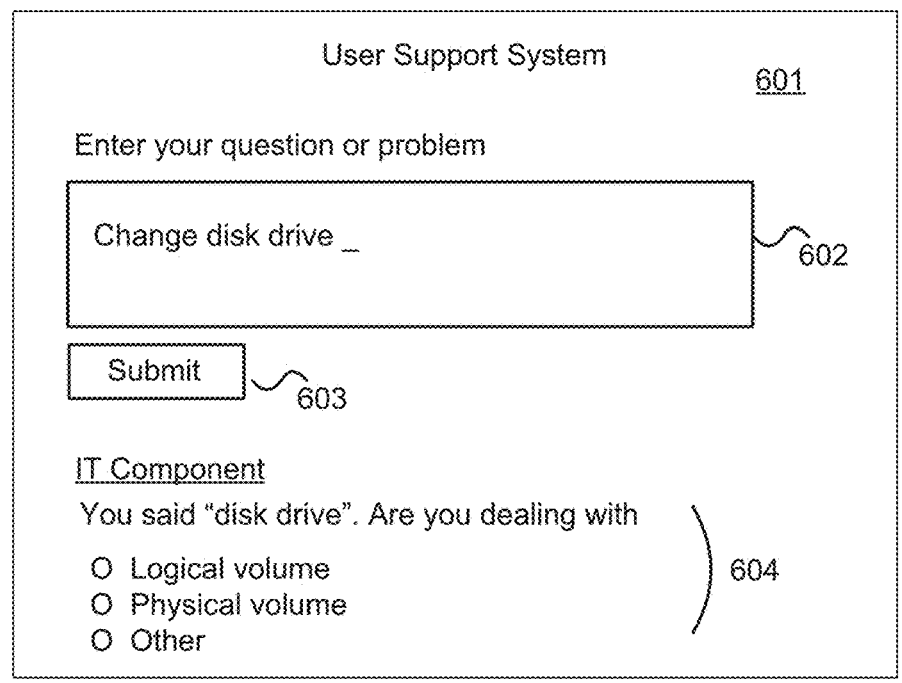
FIGS. 6-8 illustrate additional exemplary user interface menus that a self-service support system may present to the user to obtain more details about a user query in order to effectively process the query and identify relevant results, in accordance with embodiments of the present invention.
Figure 7:
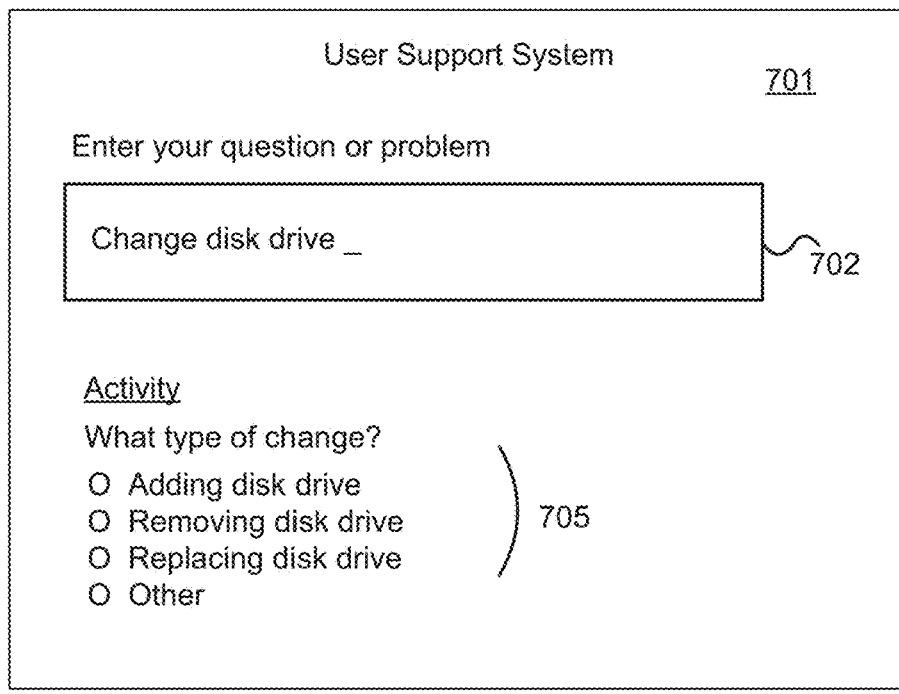
Figure 8:
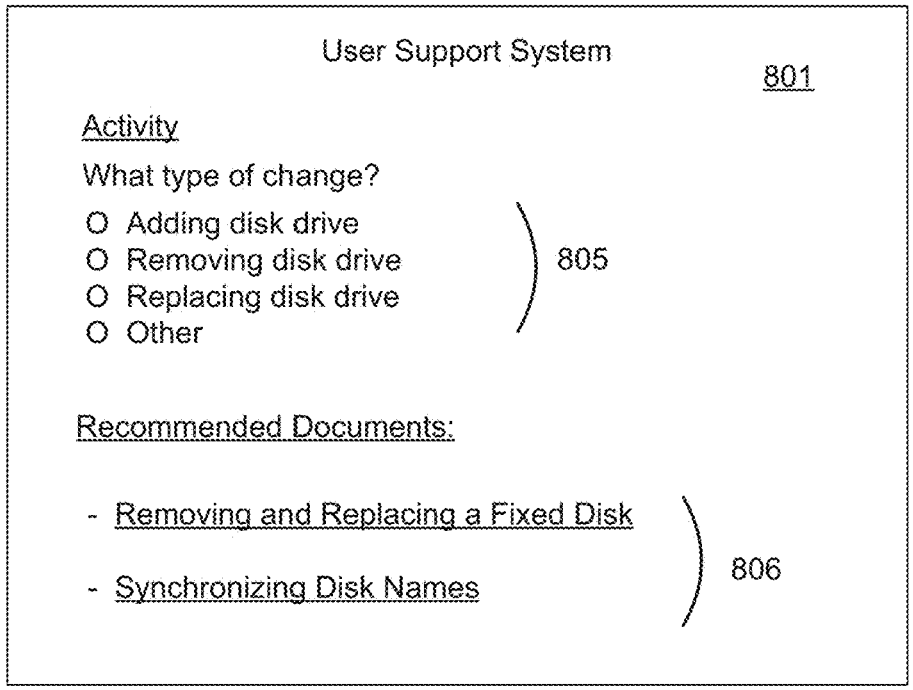

FIG. 5 illustrates an exemplary user screen of a self-service support system, e.g., system 300, to allow a user to enter a user query or question about products or services, according to an embodiment of the invention. The user screen 501 may include a user interface component 502 in which the user may enter a question or describe a service need or problem. Upon selecting submit button 503, the self-service support system 300 may display a follow-on screen, as shown in FIG. 6, which may prompt the user for additional information about the user query. For example, if the user had entered "Change disk drive" in the user interface component 502, then the support system 300 may ask the user to select whether the disk drive is for a logical volume or a physical volume, as illustrated by user choices 604 in FIG. 6. In addition, the user interface 302 may display a user interface component where the user does not have to select one of the system choices, but can enter the user's own terms. These terms may then be used for extending the ontology by the ontology builder 410.

The support system 300 may continue to prompt the user for additional details about the user's need or problem by presenting other user screens until it could determine that the description of the user query is sufficiently complete and specific for a data search. For example, in the disk drive change scenario, the support system 300 may ask the user to specify the type of disk drive change as illustrated by user question 705 in FIG. 7. Once a query logic system 400 has a reasonably complete description of the user's need or problem, its components would process the user query, as described with reference to FIG. 4. The results from a search for information relevant to the user query may be displayed to the user as document list 806 in FIG. 8.

Figure 9:
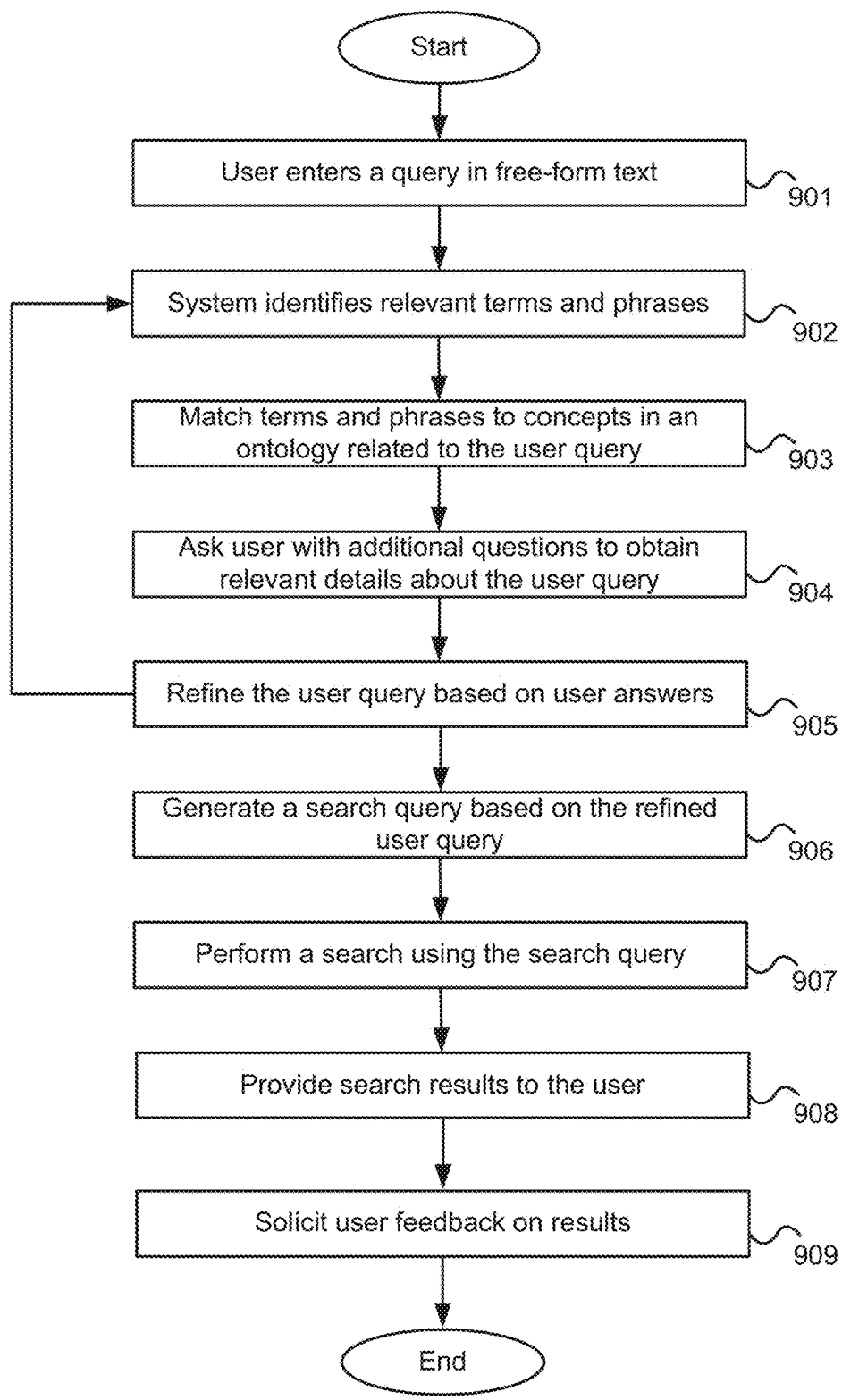
FIG. 9 is a flowchart of a process for receiving and analyzing a user query based on an ontology of domain-specific information, and returning information relevant to the user query, according to an embodiment of the present invention.

FIG. 9 is a flowchart of a process for receiving and analyzing a user query based on a domain-specific ontology, and returning information relevant to the user query, according to an embodiment of the disclosure. The process may start at step 901 where a user enters a user query or question in free-form text, such as the phrase "change disk drive".

In step 902, a natural language processor, such as natural language processing layer 402 of the query logic system 400, generates substrings relevant to the user query, such as by extracting key terms about the user's need or problem from the user query, e.g., "change" and "disk drive". Generating the substrings may comprise utilizing a linguistic category assigned to different words of the user query and/or utilizing a single word consisting of a lemma that is specific to each word of a plurality of words of the user query.

In step 903, an ontology analyzer performs an ontology analysis to output terms of an ontology of domain-specific information and further outputs relationships between pairs of the terms. The outputted terms are constrained to match the relevant substrings so that the domain-specific information of the ontology relates to the user query. Thus, the ontology layer 407 in the query logic system 400, may analyze a related domain ontology and match the extracted key terms against concepts and relationships in the ontology, at step 903.

In step 904, a query analysis is performed to analyze the user query with respect to the outputted terms and relationships between the terms. If the query logic system 400 determines that the user query is not complete or specific enough for a search, then the query processing layer 416 may generate additional questions about the user's need or problem, per step 904. The query processing layer 416 may further refine the user query, at step 905, to make it more complete and specific for a search, based on the user's answers to these questions. The query processing layer 416 may reprocess the refined user query as shown by the loop back from step 905 to step 902.

The query analysis ascertains whether the user query is more suitable for service than for a search for information. If it is ascertained by the query analysis that the user query is more suitable for service than for a search for information, then service actions to be performed by the user are identified to the user. If it is ascertained by the query analysis that the user query is not more suitable for service than for a search for information, then: (i) the user query is refined based on the outputted terms and relationships between the terms and/or answers to questions (step 905); (ii) a search query is generated (step 906) based on the refined user query; (iii) a search is initiated (step 907) based on the search query; and (iv) results of the search are provided to the user (step 908).

At step 906, the query processing layer 416 in the query logic system 400 may generate a search query that includes search terms, concepts and annotations, based on the refined user query. The query logic system 400 may provide the search query to a search layer 419 for identifying information relevant to the user's problem or need, using the search query, at step 907. The search layer 419 may use a search engine or data analytics program 417 to search repositories 418 of product and service information. In addition to presenting the search results to the user at step 908, the query logic system 400 may solicit user feedback concerning the relevancy of the resulting information, per step 909.

Figure 10:
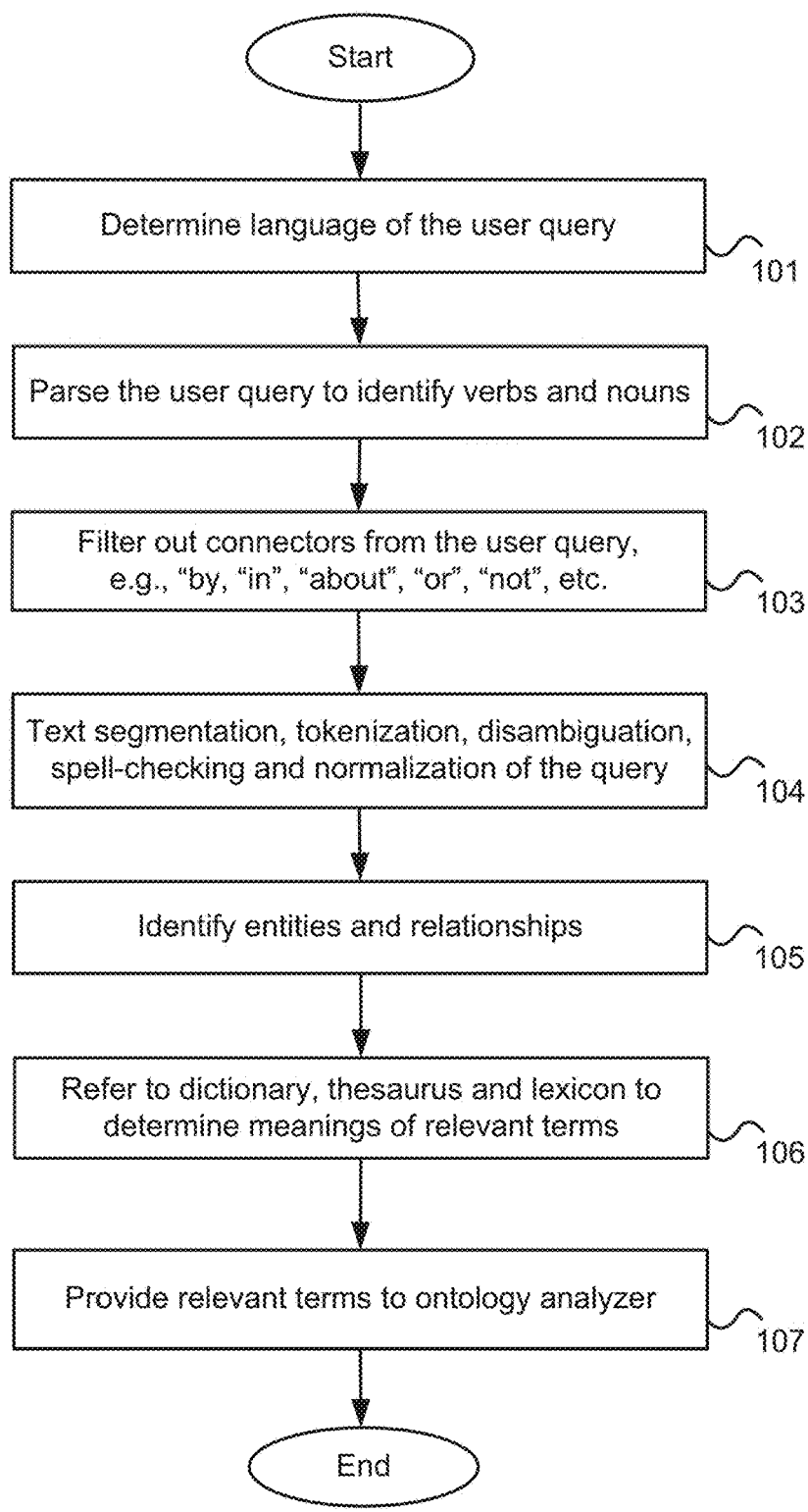
FIG. 10 is a flowchart of a process that a natural language processor may follow for analyzing a user query to extract relevant terms and parameters, and providing them to an ontology analyzer, according to an embodiment of the present invention.

FIG. 10 is a flowchart of an exemplary process that a natural language processing layer 402 may follow for analyzing a user query to extract relevant terms and details about the user's need or problem, and providing them to an ontology layer 407. The natural language processing layer 402 may start at step 101 by determining the language of the user query, e.g., English. It may parse the user query to extract verbs and nouns from the query, at step 102. The verbs generally relate to the actions that the user is interested in performing, and the nouns generally correspond to the objects involved (such as a particular product, situation, or a technology component). The natural language processing layer 402 may ignore connecting words in the statement, e.g., "about", "in" and "by" (step 103). It may perform other tasks on the user query such as text segmentation, tokenization, disambiguation, spell-checking and normalization, per step 104. These tasks were previously described with reference to FIG. 4.

The natural language processing layer 402 may identify entities (e.g., key terms) and relationships in the user query, at step 105 (for example, "failed", "after", and "installation"). If there are terms in the user query that the natural language processing layer 402 does not recognize, it may refer to a dictionary, thesaurus, or lexicon at step 106 to help determine their meaning and the user's intent. Once the natural language processing layer 402 has extracted relevant terms from the user query, it may forward these terms to an ontology analyzer (such as ontology layer 407) for analyzing a domain-specific ontology related to the user query, and matching the terms against concepts in the ontology, per step 107.

Figure 11:
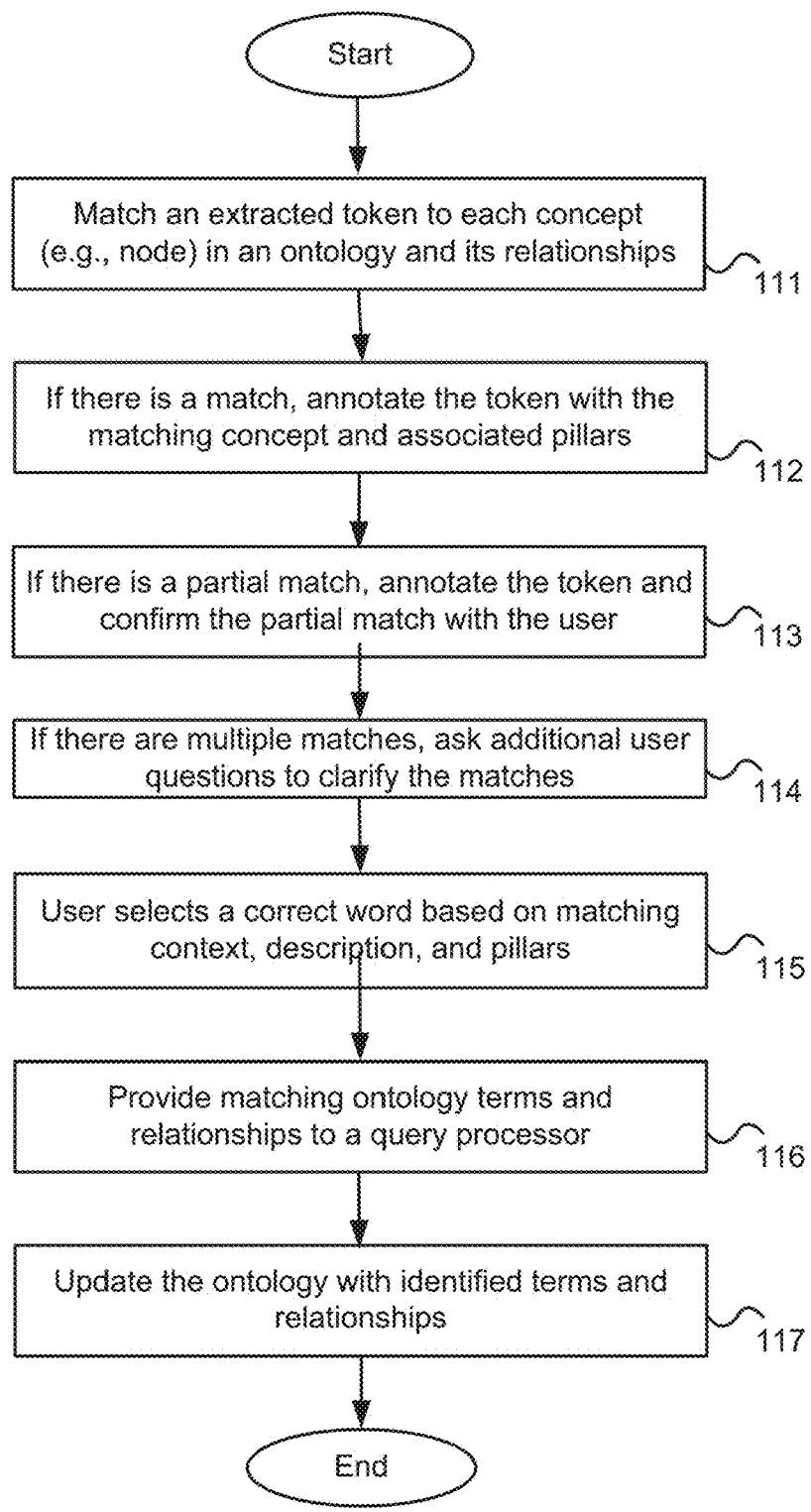
FIG. 11 is a flowchart of a process that an ontology analyzer may follow for matching relevant terms from a user query against an ontology of domain-specific information to generate a search query for a search engine, according to an embodiment of the disclosure.

FIG. 11 is a flowchart of an exemplary process that an ontology layer 407 may follow for matching relevant terms from a user query against concepts and relationships in a domain-specific ontology. The process may start at step 111 where an ontology concept matcher 408 matches a token extracted from the user query to concept in an ontology (e.g., a node in an ontology structure), and attributes and relationships associated with the concept. Attributes may include sub-components, acronyms, and synonyms of the concept. If there is a match between the token and a concept in the ontology, the natural language processing 402 may annotate the token with the matching concept and its associated pillars, per step 112. The associated pillars may include situations, activities, products, IT components, etc., that mirror requirements of a "perfect" query.

If the ontology concept matcher 408 identifies a partial match between a token and an ontology concept, the natural language processing layer 402 may annotate the matching token, and if necessary the query logic system 400 may confirm the partial ontology match with the user, per step 113. In case the ontology concept matcher 408 identifies multiple ontology concepts that match a token, the query logic system 400 may ask the user to clarify and select the best ontology match through questions for the user, at step 114. The user can choose the correct words based on the context, pillar and description of the matching token and ontology concepts, per step 115.

The query logic system 400 may perform the process illustrated in FIG. 11 for each token extracted from the user query and may iteratively refine the user query based on concepts and relationships from the ontology, with the goal of increasing the relevance of search results. Based on the analysis of the ontology, the ontology concept matcher 408 may output a set of terms from the ontology, and their relationships, that match the relevant substrings extracted from the user query. The ontology layer 407 may provide the matched terms and relationships the query processing layer 416 for continued processing by the query logic system 400, at step 116.

As described above with reference to FIG. 4, the ontology layer 407 may comprise an ontology builder 410 for updating a domain ontology with terms and relationships that the query logic system 400 identifies while processing user queries, per step 117. The ontology builder 410 thus extends the ontology and refines its contents over time in terms of completeness and accuracy, based on actual user needs and problems and information identified in response to user queries. Once the ontology-matching process is completed, the query logic system 400 may forward matched ontology concepts to a query processing layer 416 to refine the query with additional user input if necessary.

Figure 12:
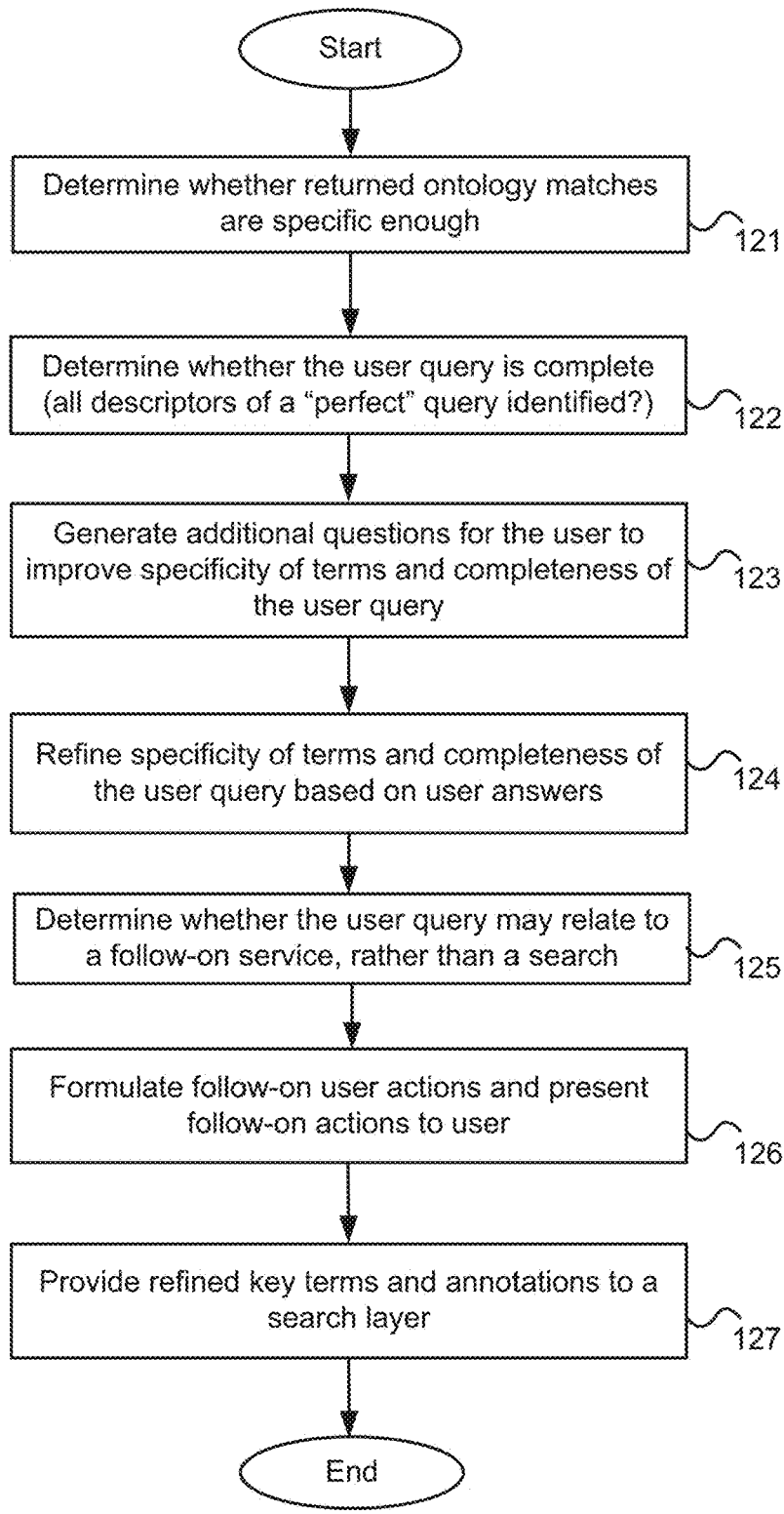
FIG. 12 is a flowchart of a query refining process to determine the completeness and specificity of a user query, further refine the query with user questions and answers, and determine follow-on actions, according to an embodiment of the present invention.

FIG. 12 is a flowchart of an exemplary query refining process that a query processing layer 416 may follow to determine the completeness and specificity of a user query. The process may refine the query with additional user questions and answers, and determine follow-on user actions. A query processing layer 416 in the query logic system 400 may start at step 121 to determine whether ontology matches for a user query, as returned from an ontology concept matcher 408, are specific enough for a search of related information. If the matches are not sufficiently specific, the question and answer processor 413 may generate and ask the user additional questions to clarify the user's need or problem, as previously described with reference to FIG. 4.

The query processing layer 416 may further determine whether the user query is sufficiently complete for processing, per step 122. For example, the completeness checker 412 of the query logic system 400 may determine whether each part of a "perfect" query is present in the user query. For any missing key descriptors, the query logic system 400 may ask the user additional questions with the goal of satisfying each part of a "perfect" query, at step 123. The query processing layer 416 may refine, at step 124, the specificity and completeness of the key descriptors with the additional information that the user supplies in response to the questions.

Thus in one embodiment, it is determined that the outputted terms and relationships between the terms (from step 903 in FIG. 9) are not sufficiently specific to enable a search for requested information in the user query after the user query is refined based on the outputted terms and relationships between the terms. Accordingly, questions are presented to the user pertinent to the outputted terms and relationships between the terms not being sufficiently specific. From the user's response to the presented questions, clarification is received with respect to a specificity of the outputted terms and relationships between the terms. Then the user query is modified, based on the received clarification, to enable the refined user query to be sufficiently specific to enable a search for requested information in the refined user query based on the outputted terms and relationships between the terms. In this embodiment, the refined user query, based on the outputted terms and relationships between the terms, comprises the modified user query based on the received clarification.

Thus in one embodiment, it is determined that the user query is not sufficiently complete due to the user query not including sufficient information to enable an expert in a field pertinent to the user query to respond to a request for information in the user query. Accordingly, questions are presented to the user pertinent to the user query not being sufficiently complete. From the user's response to the presented questions, information missing from the user query is received from the user. Then the user query is modified, based on the received missing information, to enable the expert in the field to respond to the request for information in the user query. In this embodiment, the refined user query, based on the outputted terms and relationships between the terms (from step 903 in FIG. 9), comprises the modified user query based on the missing information.

At step 125, the query processing layer 416 may conclude, based on information extracted from the user query, that the user query is more suitable for a service rather than a search for information, e.g., a product replacement due to a defect. In that case, the query logic system 400 may direct the user to a service handling system rather than continuing with the information search. Furthermore, if the query processing layer 416 determines that user actions are needed to accurately determine the user's need or problem, or relevant information, it may formulate follow-on actions and present them to the user at step 126.

In case the query processing layer 416 determines that the user query descriptors are sufficiently complete and specific, it may forward the descriptors to the search layer 419 in the query logic system 400, at step 127. The search layer 419 may use a search engine or data analytics program 417 to search information sources 418 such as databases, intranets, or the Internet. The search engine or data analytics program 417 may identify from the sources 418 information related to the user query and return the identified information to the user through user interface 302.

The subject matter described above is provided by way of illustration only and should not be construed as limiting. Various modifications and substitutions of the described components and operations can be made by those skilled in the art without departing from the spirit and scope of the disclosure defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable physically tangible media or hardware devices such as persistent storage 213 (see FIG. 2) such as a floppy disk, ROM, hard disk, removable media, flash memory, a "memory stick", optical media, magneto-optical media, CD-ROM, etc.

Accordingly, aspects of the present invention may take the form of an entirely hardware embodiment, an entirely software embodiment (including firmware, resident software, micro-code, etc.) or embodiment combining software and hardware aspects that may all generally be referred to herein as a "circuit," "module" or "system." Furthermore, aspects of the present invention may take the form of a computer program product comprising one or more physically tangible (e.g., hardware) computer readable medium(s) or devices having computer readable program code stored therein, said program code configured to be executed by a processor of a computer system to implement the methods of the present invention. In one embodiment, the physically tangible computer readable medium(s) and/or device(s) (e.g., hardware media and/or devices) that store said program code which implement methods of the present invention do not comprise a signal generally, or a transitory signal in particular.

Any combination of one or more computer readable medium(s) or devices may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium or device may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any physically tangible medium or hardware device that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection be made to an external computer (for example, through the Internet using an Internet Service Provider).

Aspects of the disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for providing, by a self-service user support software application for assisting customers having a product or service problem, information, received via a search conducted over an Internet computer network using a refined user query, to a user in response to a received input user query, said method comprising:

receiving, by a processor of a computer system, an input user query from a user interface component in a screen, said received input user query expressed in a free-form text format, said computer system comprising the screen, said input user query pertaining to a problem of the user which is a problem that the user experiences with a product or service;

said processor performing a natural language analysis to generate substrings relevant to the received input user query, wherein said performing the natural language analysis comprises extracting details from the user query, and wherein said performing the natural language analysis comprises identifying a language of text in the input user query, recognizing a misspelling of one word in the input user query, determining a canonical form of another word in the input user query, recognizing a term in the input user query pertaining to a technical support domain, and semantically recognizing an incident expressed in the input user query;

after said performing the natural language analysis, said processor performing an ontology analysis to output terms of an ontology of domain-specific information specific to a domain pertaining to products and to further output relationships between pairs of said terms, said outputted terms constrained to match the relevant substrings generated by said performing the natural language analysis;

said processor capturing, via an ontology model included in the ontology, elements of a perfect or complete query, wherein the elements of the perfect or complete query include information pertaining to the problem of the user;

during said performing the ontology analysis, said processor identifying multiple outputted terms that match one of the relevant substrings, requesting from the user a selection of one outputted term of the multiple outputted terms, and receiving from the user the selection of the one outputted term of the multiple outputted terms;

after said performing the ontology analysis, said processor performing a query analysis to analyze the input user query with respect to the outputted terms and relationships between the terms;

said processor refining the input user query based on the outputted terms and relationships between the terms;

said processor generating a search query based on the refined user query;

said processor initiating a search by sending the search query across the Internet computer network to a search engine configured to perform the search, based on the search query, via one or more databases;

said processor receiving from the search engine results of the search via the user interface component in the screen; and after said performing the ontology analysis, said processor performing a query analysis to analyze the input user query with respect to the outputted terms and relationships between the terms.

2. The method of claim 1, wherein the details extracted from the user query include a type of the problem of the user, what the user was doing when the problem of the user occurred, an environment in which the problem of the user occurred, product components affected by the problem of the user, and conditions that have changed as a result of the problem of the user.

3. The method of claim 1, wherein the information pertaining to the problem of the user include: what the problem of the user is, where the problem of the user occurs, an environment of the problem of the user, and what activity of the user led to the problem of the user.

4. The method of claim 1, wherein said capturing elements of a perfect or complete query is a use of the domain.

5. The method of claim 1, said method further comprising:
said processor soliciting feedback from the user concerning a relevancy of the results of the search.

6. The method of claim 1, wherein said performing the query analysis comprises:
determining that the outputted terms and relationships between the terms are not sufficiently specific to enable a search for requested information in the input user query after the input user query is refined based on the outputted terms and relationships between the terms;

presenting questions to the user pertinent to the outputted terms and relationships between the terms not being sufficiently specific;

receiving, from the user in response to the presented questions, clarification with respect to a specificity of the outputted terms and relationships between the terms; and modifying the input user query, based on the received clarification, to enable the refined user query to be sufficiently specific to enable said search for requested information in the refined user query, wherein said refining the input user query comprises refining the modified user query.

7. The method of claim 1, wherein said performing the query analysis comprises:
determining that the input user query is not sufficiently complete due to the input user query not including sufficient information to enable an expert in a field pertinent to the input user query to respond to a request for information in the input user query;

presenting questions to the user pertinent to the input user query not being sufficiently complete;

receiving, from the user in response to the presented questions, information missing from the input user query; and modifying the input user query, based on the received missing information, to make the input user query sufficiently complete to enable the expert in the field to respond to the request for information in the input user query, wherein said refining the input user query comprises refining the modified user query.

8. The method of claim 1, wherein the ontology is represented as a tree comprising nodes and edges connecting adjacent nodes, wherein each node is associated with a term of the ontology such that the nodes of the tree comprise the outputted terms that match the relevant substrings, and wherein each edge connecting adjacent nodes represents a relationship between the terms to which the adjacent nodes are respectively associated.

9. The method of claim 1, wherein said performing the ontology analysis comprises:
identifying multiple terms of the ontology that match a selected substring of the generated substrings;

in response to said identifying multiple terms, presenting questions to the user for assisting the user to select a term of the multiple terms;

after said presenting questions to the user, receiving from the user a selected term of the multiple terms that best matches the selected substring.

10. The method of claim 1, wherein said performing the ontology analysis comprises annotating a substring of the generated substrings with a term of the outputted terms.

11. The method of claim 1, wherein said performing the natural language analysis comprises assigning a linguistic category to different words of the input user query, wherein each linguistic category is specific to the word to which each linguistic category is assigned, and wherein generation of the substrings by performing the natural language analysis comprises utilizing the linguistic category assigned to the different words of the input user query.

12. The method of claim 9, wherein a first, second, and third linguistic category assigned to a first, second, and third word is a noun, a verb, and an adjective, respectively.

13. The method of claim 1, wherein said performing the natural language analysis comprises performing a morphological analysis to determine a single word consisting of a lemma that is specific to each word of a plurality of words of the user input query, and wherein the generated substrings comprise the lemma specific to each word of the plurality of words of the input user query.

14. The method of claim 1, wherein the generated substrings comprise a first substring that matches a concept of the ontology and attributes and relationships associated with the concept, wherein said performing the ontology analysis comprises annotating the first substring with the concept and with pillars of the concept, and wherein the pillars of the concept include situations, activities, products, and IT components of the concept that mirror requirements of a perfect query.

* * * * *